US012126403B2

(12) United States Patent
Sgraja et al.

(10) Patent No.: US 12,126,403 B2
(45) Date of Patent: Oct. 22, 2024

(54) MODIFYING A DOPPLER ESTIMATION COMPUTATION FOR MISSING REFERENCE SIGNALING

(71) Applicant: QUALCOMM Incorporated, San Diego, CA (US)

(72) Inventors: Christian Sgraja, Ehingen (DE); Stefan Brueck, Neunkirchen am Brand (DE)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 17/652,219

(22) Filed: Feb. 23, 2022

(65) Prior Publication Data

US 2023/0268957 A1  Aug. 24, 2023

(51) Int. Cl.
H04B 7/01 (2006.01)
H04W 24/10 (2009.01)

(52) U.S. Cl.
CPC .................... H04B 7/01 (2013.01)

(58) Field of Classification Search
CPC .......... H04B 7/01; H04B 7/06; H04B 17/309; H04W 24/10; H04W 72/04
See application file for complete search history.

(56) References Cited

FOREIGN PATENT DOCUMENTS

| EP | 3334071 A1 | 6/2018 | |
| WO | WO-2015133825 A1 * | 9/2015 | .......... H04J 11/0036 |
| WO | WO-2017052457 A1 * | 3/2017 | ............. H04L 5/001 |
| WO | 2022069014 A1 | 4/2022 | |
| WO | 2022155675 A1 | 7/2022 | |
| WO | WO-2022203442 A1 * | 9/2022 | ........... H04B 17/309 |

OTHER PUBLICATIONS

International Search Report and Written Opinion—PCT/US2023/060646—ISA/EPO—Apr. 14, 2023.
Moderator, NTT Docomo et al., "Summary on [101-e-Post-NR-UE-Features-01]", 3GPP TSG RAN WG1 #101, R1-2005105, 3rd Generation Partnership Project, Mobile Competence Centre, 650, Route Des Lucioles, F-06921 Sophia-Antipolis Cedex, France, vol. RAN WG1, No. e-Meeting, May 25, 2020-Jun. 5, 2020, Jun. 11, 2020, XP051897019, pp. 1-13, p. 1-p. 4, Section 2.1 (p. 2).

* cited by examiner

Primary Examiner — Blane J Jackson
(74) Attorney, Agent, or Firm — Harrity & Harrity, LLP

(57) ABSTRACT

Various aspects of the present disclosure generally relate to wireless communication. In some aspects, a user equipment (UE) may detect that at least a portion of reference signaling expected in a channel is not present in the channel. The UE may modify a Doppler estimation computation associated with the reference signaling based at least in part on detecting that at least the portion of the reference signaling is not present in the channel. Numerous other aspects are described.

30 Claims, 9 Drawing Sheets

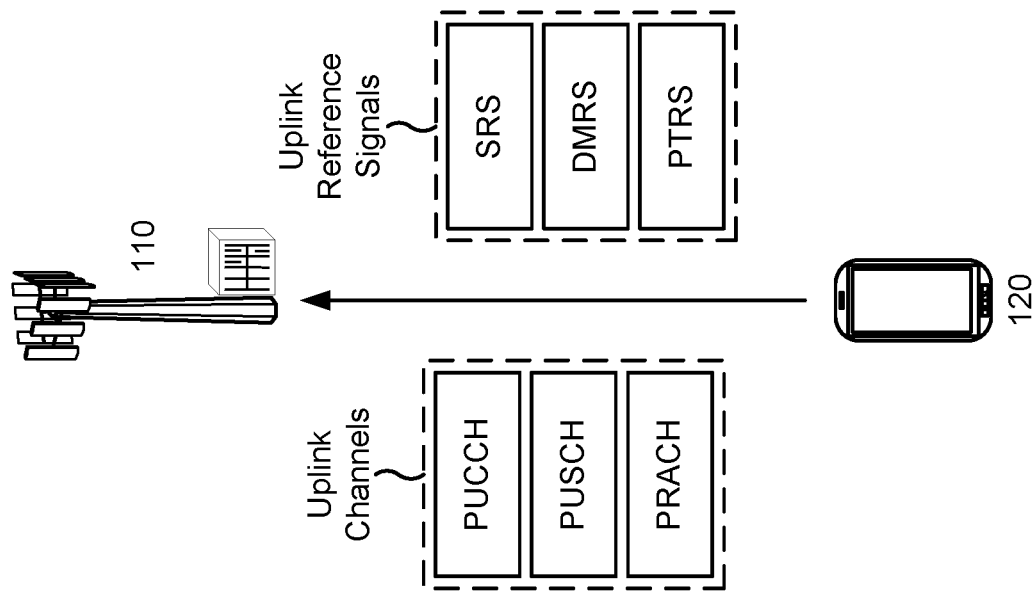
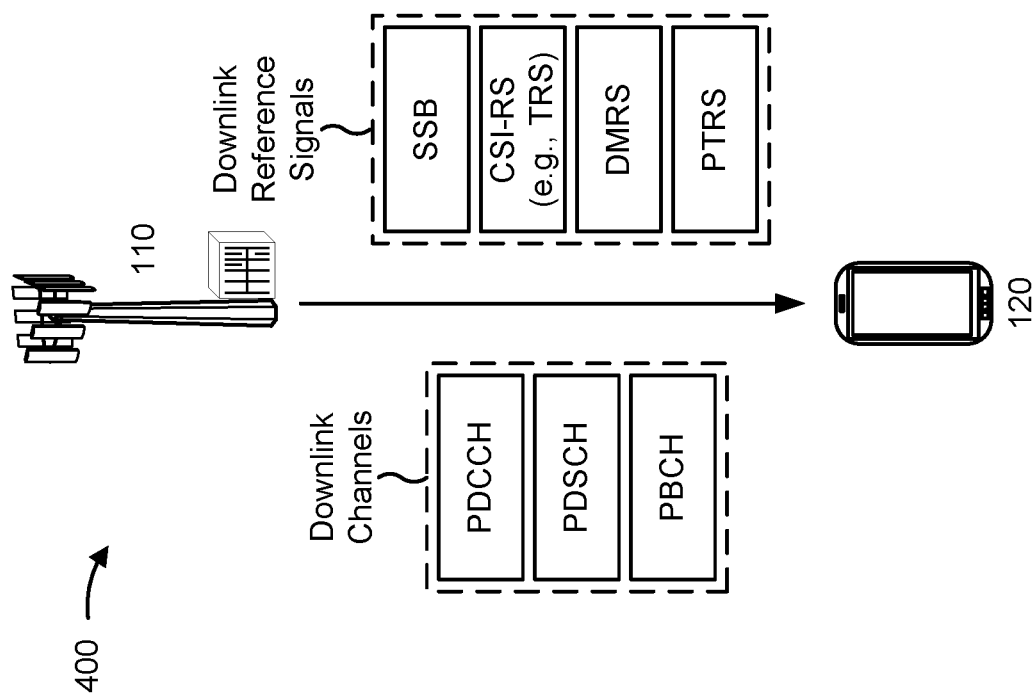
FIG. 4

MODIFYING A DOPPLER ESTIMATION COMPUTATION FOR MISSING REFERENCE SIGNALING

FIELD OF THE DISCLOSURE

Aspects of the present disclosure generally relate to wireless communication and to techniques and apparatuses for modifying a Doppler estimation computation for missing reference signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include detecting that at least a portion of reference signaling expected in a channel is not present in the channel. The method may include modifying a Doppler estimation computation associated with the reference signaling based at least in part on detecting that at least the portion of the reference signaling is not present in the channel.

Some aspects described herein relate to an apparatus for wireless communication at a UE. The apparatus may include a memory and one or more processors coupled to the memory. The one or more processors may be configured to detect that at least a portion of reference signaling expected in a channel is not present in the channel. The one or more processors may be configured to modify a Doppler estimation computation associated with the reference signaling based at least in part on detecting that at least the portion of the reference signaling is not present in the channel.

Some aspects described herein relate to a non-transitory computer-readable medium that stores a set of instructions for wireless communication by a UE. The set of instructions, when executed by one or more processors of the UE, may cause the UE to detect that at least a portion of reference signaling expected in a channel is not present in the channel. The set of instructions, when executed by one or more processors of the UE, may cause the UE to modify a Doppler estimation computation associated with the reference signaling based at least in part on detecting that at least the portion of the reference signaling is not present in the channel.

Some aspects described herein relate to an apparatus for wireless communication. The apparatus may include means for detecting that at least a portion of reference signaling expected in a channel is not present in the channel. The apparatus may include means for modifying a Doppler estimation computation associated with the reference signaling based at least in part on detecting that at least the portion of the reference signaling is not present in the channel.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
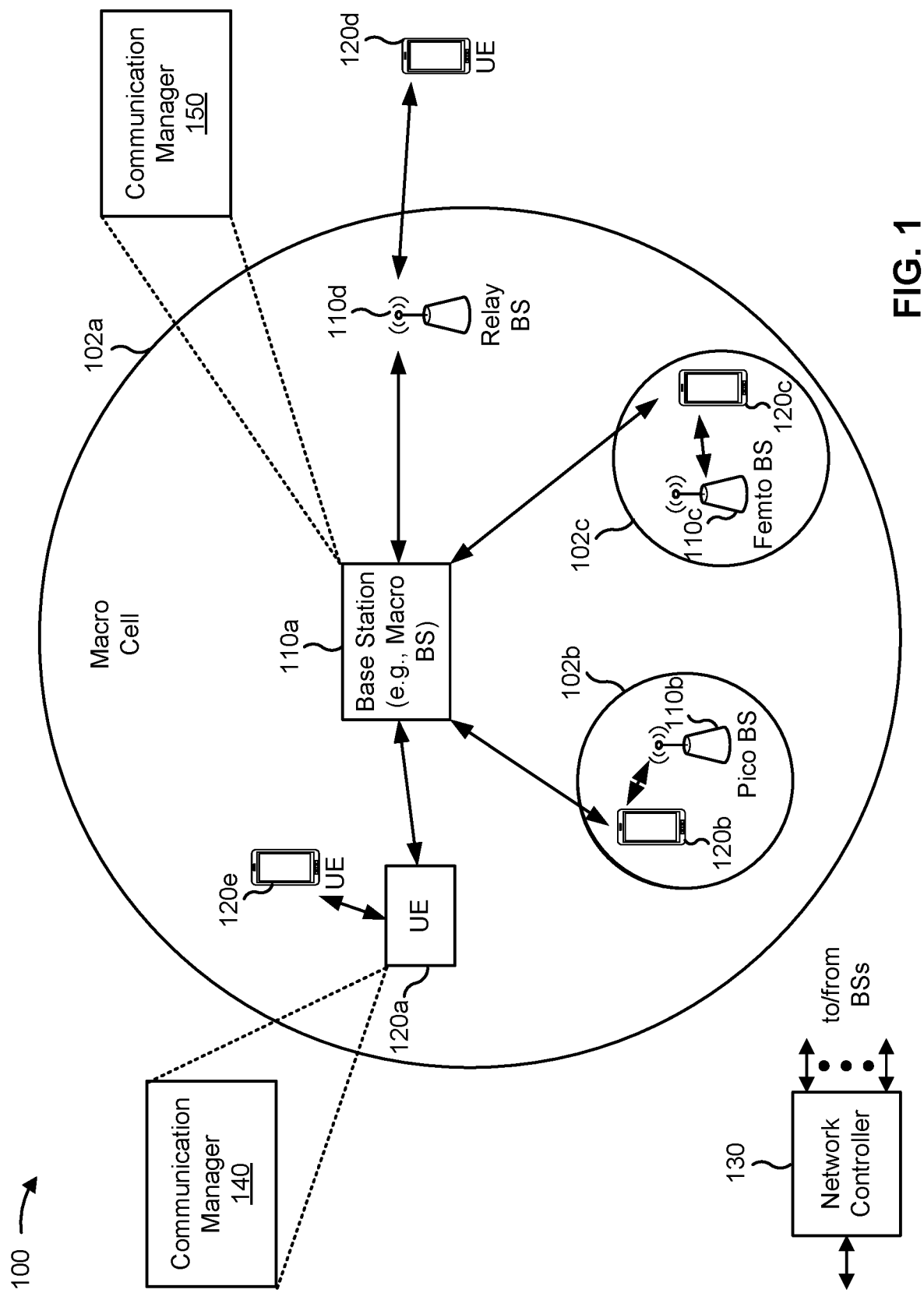
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may detect that at least a portion of reference signaling expected in a channel is not present in the channel; and modify a Doppler estimation computation associated with the reference signaling based at least in part on detecting that at least the portion of the reference signaling is not present in the channel. Additionally, or alternatively, the communication manager 140 may perform one or more other operations described herein.

In some aspects, the base station 110 may include a communication manager 150. As described in more detail elsewhere herein, the communication manager 150 may transmit reference signaling in a channel (e.g., in an unlicensed spectrum). In some aspects, the reference signaling may include reference signaling transmitted in one or more reference signal symbols of one or more reference signal slots. Additionally, or alternatively, the communication manager 150 may perform one or more other operations described herein.

As indicated above, FIG. 1 is provided as an example. Other examples may differ from what is described with regard to FIG. 1.

Figure 2:
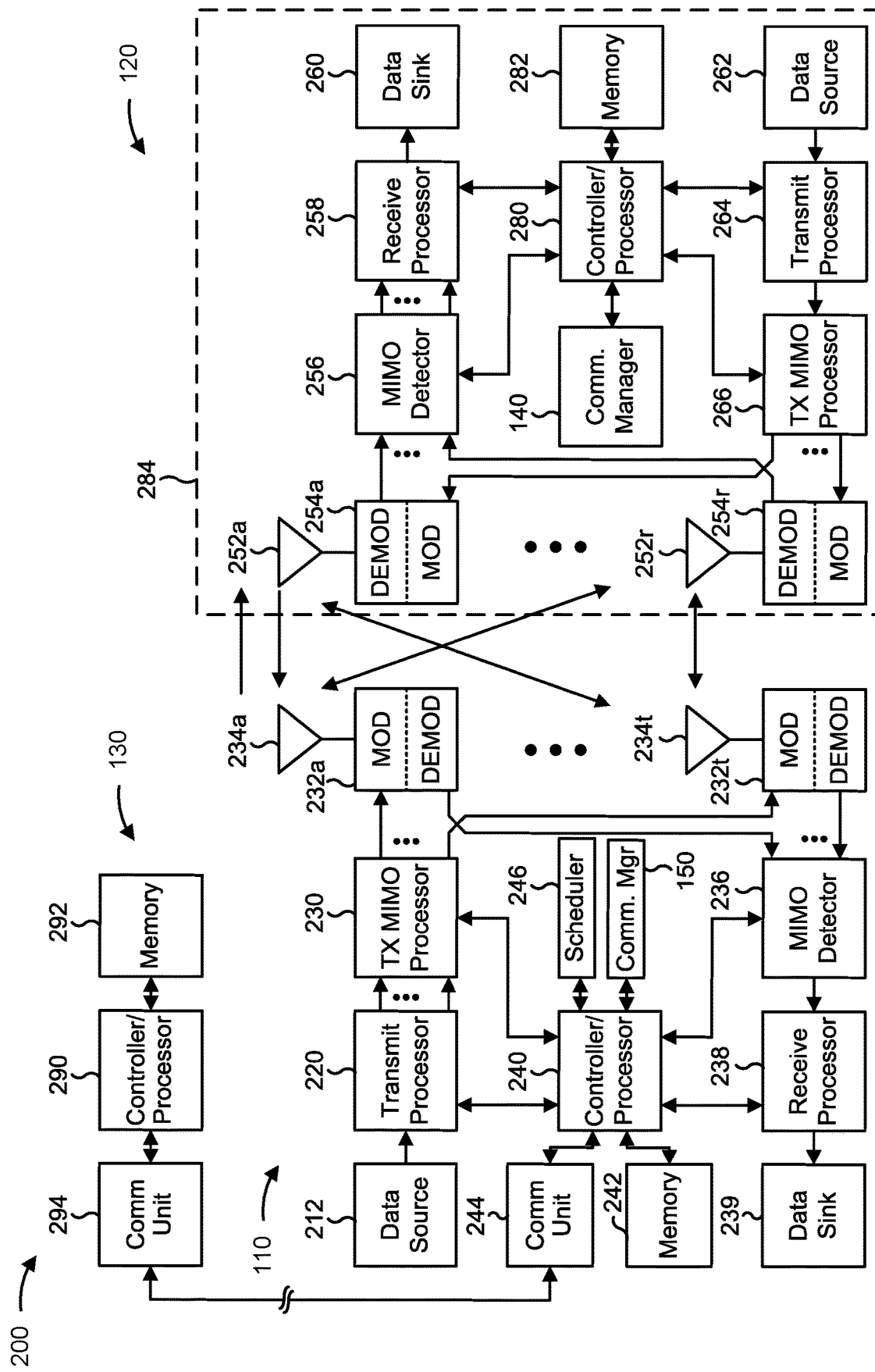
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9).

The controller/processor 240 of the base station 110, the controller/processor 280 of the UE 120, and/or any other component(s) of FIG. 2 may perform one or more techniques associated with modifying a Doppler estimation computation for missing reference signaling, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for detecting that at least a portion of reference signaling expected in a channel is not present in the channel; and/or means for modifying a Doppler estimation computation associated with the reference signaling based at least in part on detecting that at least the portion of the reference signaling is not present in the channel. The means for UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
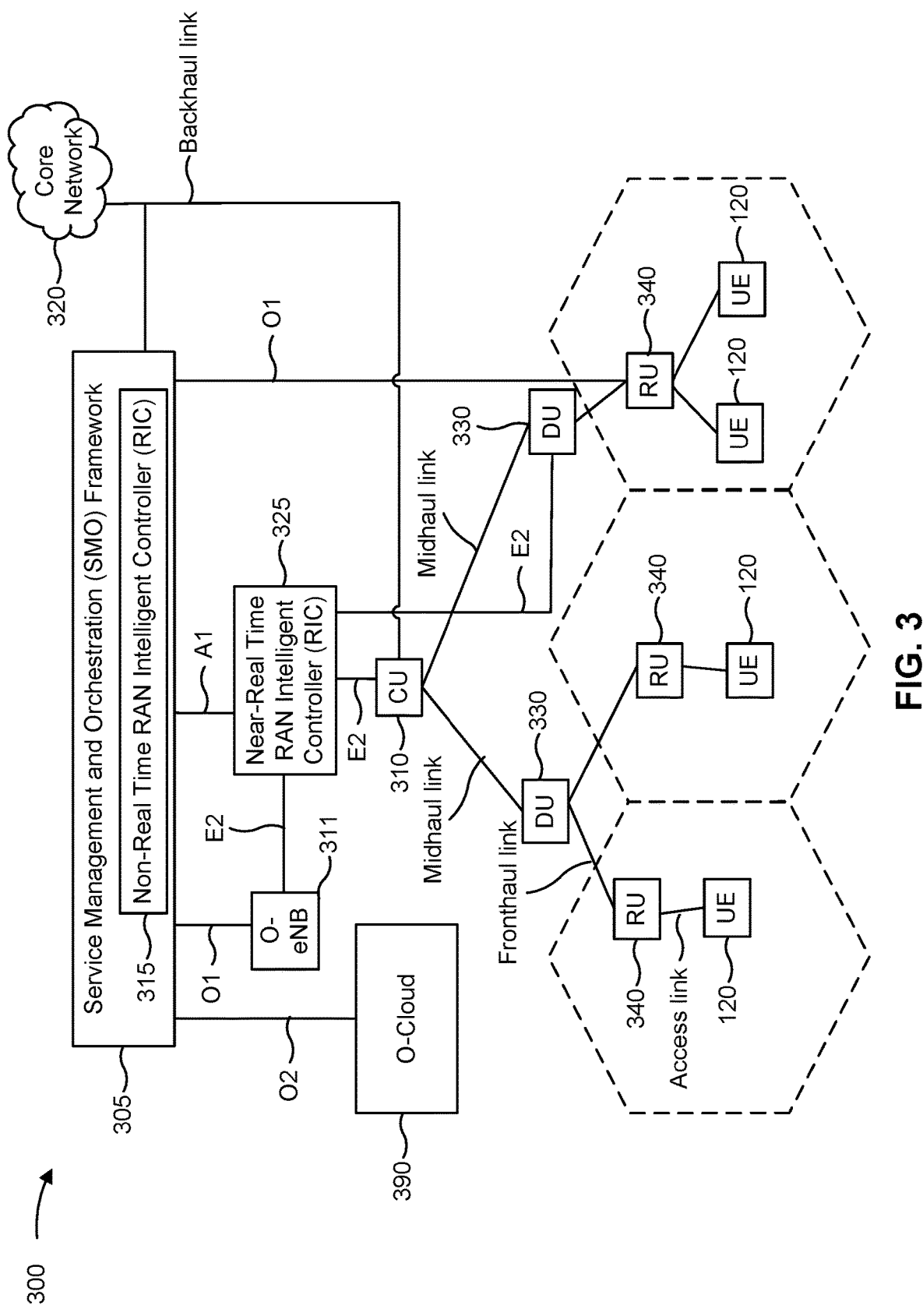
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU). "Network entity" or "network node" can refer to a disaggregated base station, or to one or more units of a disaggregated base station (such as one or more CUs, one or more DUs, one or more RUs, or a combination thereof).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT MC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples. In some aspects, a CSI-RS resource set may be configured for use as a tracking reference signal (TRS). A TRS is a downlink transmission that allows the UE 120 to track time and frequency variations with a high resolution for purposes of estimating Doppler spread in a channel, among other reasons. Aspects of TRSs are described in more detail in connection with FIG. 5.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
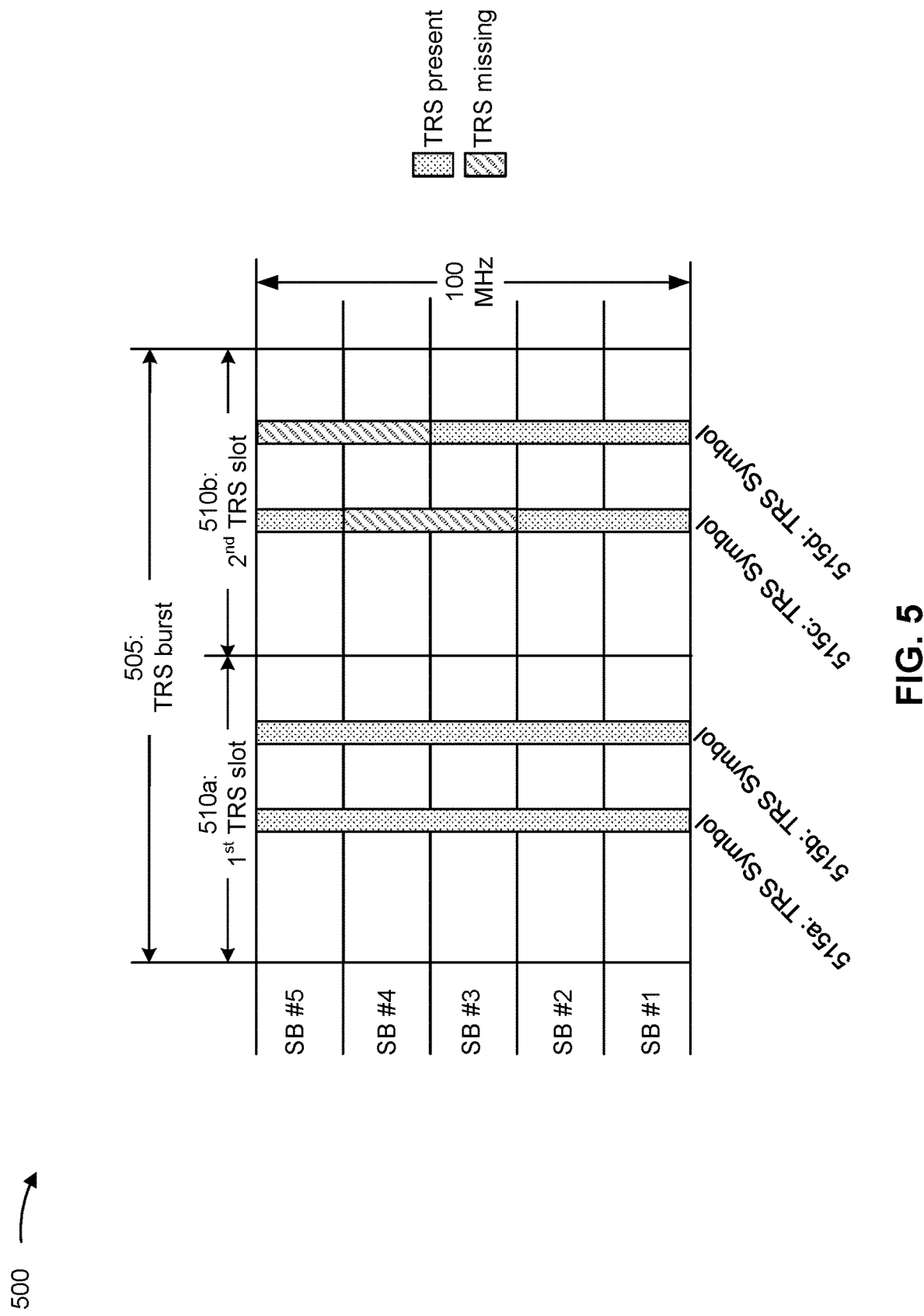
FIG. 5 is a diagram illustrating an example of a tracking reference signal burst, in accordance with the present disclosure.

FIG. 5 is a diagram illustrating an example 500 of a TRS burst, in accordance with the present disclosure.

As described above in connection with FIG. 4, in some aspects, a CSI-RS resource set may be configured for use as a TRS for purposes of tracking time and frequency variations with a high resolution for estimating Doppler spread in a channel, among other purposes. In some aspects, one or more TRSs may be provided in a TRS burst 505. The TRS burst 505 may include multiple TRS symbols configured over one or more TRS slots. For example, in the example depicted in FIG. 5, the TRS burst 505 includes two TRS slots 510 (e.g., a first TRS slot 510*a* and a second TRS slot 510*b*), with each slot including two TRS symbols 515 (e.g., a first TRS symbol 515*a* and a second TRS symbol 515*b* in the first TRS slot 510*a*, and a third TRS symbol 515*c* and a fourth TRS symbol 515*d* in the second TRS slot 510*b*). In some aspects, the TRS symbols 515 within the same TRS slot 510 may be separated by four symbols. Each TRS symbol 515 may include multiple resource elements configured for receiving TRSs. For example, each TRS symbol 515 may have a resource density of three resource elements per physical resource block configured for resource signaling. Moreover, although the TRS burst 505 shown in FIG. 5 includes two contiguous TRS slots 510 (e.g., the first TRS slot 510*a* and the second TRS slot 510*b*), in some other aspects a TRS burst may include a single TRS slot 510, with two TRS symbols 515 included in the single TRS slot 510.

In some aspects, a periodicity of the TRS burst 505 may be configured by a network entity (e.g., a base station 110, a CU 310, a DU 330, an RU 340, or a similar network entity). For example, in some aspects, the periodicity of the TRS burst 505 may be 10, 20, 40, or 80 milliseconds (ms). Additionally, or alternatively, in some aspects, a UE 120 may be configured with an aperiodic TRS, such as to provide a time and frequency reference at the start of a data transfer when the UE 120 has not received a TRS for a relatively long period of time. Moreover, in some aspects, a bandwidth of the TRS symbols 515 of the TRS burst 505 may be configured by a network entity. For example, in FIG. 5, reference signaling in each of the TRS symbols 515 extends across five contiguous sub-bands (SBs). In this aspect, each sub-band may have a bandwidth of 20 MHz, and thus the TRS symbols 515 may have a bandwidth of 100 MHz. In some other aspects, the TRS symbols 515 may be associated with a wider or narrower bandwidth (e.g., the TRS symbols 515 may span across more or less sub-bands) without departing from the scope of the disclosure.

In some aspects, TRSs may be used for purposes of a Doppler estimation computation or the like. For example, in TRS-based Doppler estimation, the UE 120 may process frequency domain TRS symbols to obtain a raw channel estimate and noise estimate, compute a Doppler log-likelihood (LL) metric for multiple Doppler/signal to noise ratio (SNR) hypotheses (e.g., in a 2D search grid), perform infinite impulse response (IIR) filtering to the Doppler LL metrics using a filter and state per hypothesis, conduct a 2D search for the maximum Doppler LL over all hypotheses, and report the most likely Doppler bin (e.g., the winning Doppler shift frequency (fD)). The UE 120 may input the frequency domain TRS symbols (e.g., TRS symbols 515) within a TRS burst (e.g., TRS burst 505). For example, the TRS burst may include one or two slots (e.g., TRS slots 510), containing two or four TRS symbols.

In some cases, however, less than all expected reference signaling may be received by the UE 120, such as when a UE 120 and a network entity are communicating in an unlicensed spectrum, such as an unlicensed band of the 5G RAT, sometimes referred to as New Radio unlicensed (NR-U). In the NR-U band, the network entity may perform a listen before talk (LBT) operation or similar channel occupancy operation before transmitting on a sub-band to minimize interference with other entities operating in the unlicensed spectrum. In some aspects, the network entity may perform a corresponding LBT operation for each 20 MHz sub-band, such as on each sub-band of the TRS burst 505 shown in FIG. 5 (e.g., SB #1, SB #2, SB #3, SB #4, and SB #5). If an LBT operation fails (e.g., if the sub-band is occupied), the network entity may not transmit on the sub-band. For purposes of TRSs, this may result in reference signaling that is expected in the channel to be not present at certain portions of the TRS symbols 515. For example, as shown in FIG. 5, reference signaling is missing in the third TRS symbol 515*c* at sub-bands 3 and 4, and reference signaling is missing in the fourth TRS symbol 515*d* at sub-bands 4 and 5. In such aspects, a Doppler estimation computation (e.g., a filtered joint multi-symbol log-likelihood metric, or the like) may be compromised because the input to the Doppler estimation computation includes incomplete TRS symbols 515. More particularly, rather than reference signaling, noise is inputted into the model at locations where the holes in the third TRS symbol 515*c* and the fourth TRS symbol 515*d* are located. This may result in the UE 120 choosing an incorrect Doppler bin, and thus degrade channel estimation quality, leading to decreased reliability and coverage, increased latency, decreased throughput, and inefficient network usage.

Some techniques and apparatuses described herein enable a UE (e.g., UE 120) to detect whether reference signaling is present in a channel and modify a Doppler estimation computation accordingly in order to provide a more robust channel estimation and thus improve channel quality. In some aspects, a UE may detect that a portion of reference signaling (e.g., a TRS) expected in a channel (e.g., a channel associated with NR-U) is not present in the channel, and thus the UE may modify a Doppler estimation computation accordingly. For example, the UE may use only reference signaling associated with one reference signal slot (e.g., a TRS slot 510) of a reference signal burst (e.g., a TRS burst 505) for Doppler estimation if the UE detects that only the one reference signal slot is the only slot that includes a threshold value of expected reference signaling (e.g., two complete reference signal symbols (e.g., TRS symbols 515)). Moreover, the UE may use reference signaling associated with two reference signal slots for Doppler estimation if the UE detects that the reference signal burst includes at least two complete reference signal symbols. Moreover, the UE may freeze certain parameters (e.g., a filter state) associated with the Doppler estimation computation if the UE detects that no reference signal slots of the reference signal burst include a threshold value of expected reference signaling, or otherwise. In some aspects, the UE may use for Doppler estimation only portions of a reference signal symbol that overlap, in the frequency domain, with other received portions of reference symbols, either within the same reference slot or across a reference signal burst. Additionally, or alternatively, the UE may use for Doppler estimation all available reference signal symbols (even those missing reference signaling), but may in the Doppler estimation computation compensate for a phase impact associated with missing reference signal symbols. As a result, the UE may chose a correct Doppler bin and/or estimate an accurate Doppler spread even when received reference signal symbols are incomplete, resulting in improved channel estimation quality, increased reliability and coverage, decreased latency, increased throughput, and overall efficient network usage.

As indicated above, FIG. 5 is provided as an example. Other examples may differ from what is described with regard to FIG. 5.

Figure 6:
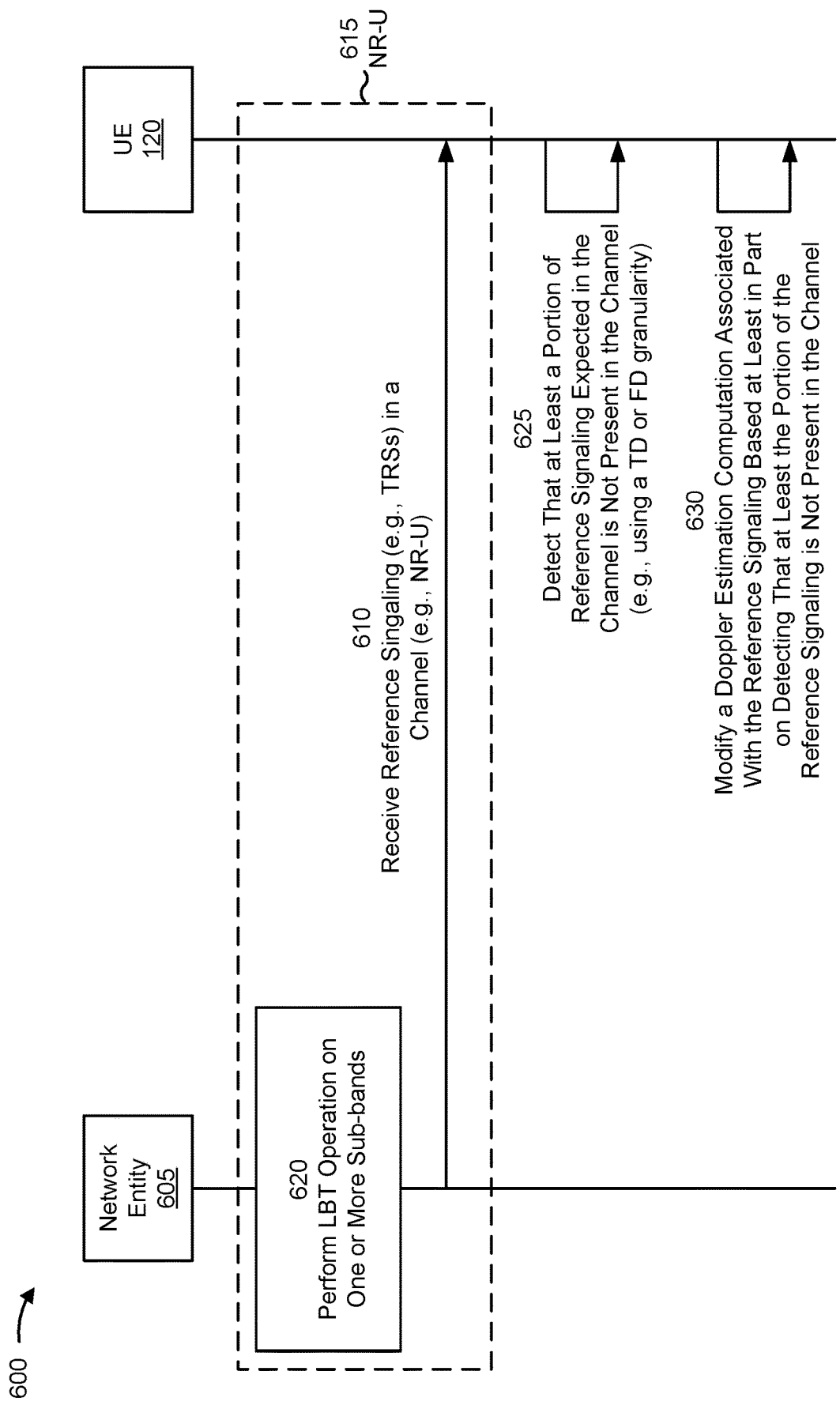
FIG. 6 is a diagram illustrating an example associated with modifying a Doppler estimation computation for missing reference signaling, in accordance with the present disclosure.

FIG. 6 is a diagram illustrating an example 600 associated with modifying a Doppler estimation computation for missing reference signaling, in accordance with the present disclosure. As shown in FIG. 6, a network entity 605 (e.g., a base station 110, a CU 310, a DU 330, an RU 340, or a similar network entity) and a UE 120 may communicate with one another.

As shown by reference number 610, the UE 120 may receive, from the network entity 605, reference signaling in a channel. In some aspects, the reference signaling may be associated with a TRS, and more particularly, may be associated with a TRS burst (e.g., TRS burst 505). In some aspects, the reference signaling may include reference signaling transmitted in one or more reference signal symbols (e.g., TRS symbols 515), of one or more reference signal slots (e.g., TRS slots 510). Moreover, in some aspects the channel may be associated with an unlicensed spectrum, such as NR-U 615 or the like. In such aspects, and as shown by reference number 620, the network entity 605 may perform one or more channel occupancy operations before transmitting the reference signaling. For example, the network entity 605 may perform an LBT operation on each sub-band (e.g., each 20 MHz sub-band) of the channel prior to transmitting the reference signaling. As described above in connection with FIG. 5, in some aspects, the LBT operations may reveal that one or more sub-bands within each reference signal symbol are occupied or are otherwise unavailable for transmission of the reference signaling (e.g., a TRS or the like). In such aspects, the reference signaling received by the UE 120, as shown by reference number 610, may include holes in the reference signal symbols. Put another way, at least a portion of reference signaling expected in the channel may not be present in the channel due to certain sub-bands being occupied and thus unavailable for use for transmitting the reference signaling. Such holes may be similar to the missing TRS shown at sub-bands three and four in the third TRS symbol 515c in FIG. 5, and the missing TRS shown at sub-bands four and five in the fourth TRS symbol 515d in FIG. 5.

As shown by reference number 625, the UE 120 may detect that the portion of reference signaling expected in the channel is not present in the channel. The UE 120 may do so using a time domain (TD) detection granularity and/or a frequency domain (FD) detection granularity. In aspects in which the UE 120 uses a TD detection granularity, the UE 120 may detect whether each reference signal symbol (e.g., each TRS symbol 515), of multiple reference signal symbols associated with a reference signal burst (e.g., the TRS burst 505), includes all expected reference signaling. In aspects in which the UE 120 uses an FD granularity, the UE 120 may detect whether each sub-band (e.g., SB #1, SB #2, SB #3, SB #4, and SB #5), of multiple sub-bands, associated with each reference signal symbol (e.g., each TRS symbol 515), of multiple reference signal symbols associated with a reference signal burst (e.g., the TRS burst 505), includes all expected reference signaling. Aspects of detection using the TD detection granularity and the FD detection granularity are described in more detail in connection with FIG. 7.

As shown by reference number 630, the UE 120 may modify a Doppler estimation computation associated with the reference signaling based at least in part on detecting that at least the portion of the reference signaling is not present in the channel. For example, the Doppler estimation computation may include a joint multi-symbol log-likelihood computation based at least in part on the reference signaling. As described in connection with FIG. 5, if reference signaling associated with the TRS symbols 515 that include missing reference signaling (e.g., the third TRS symbol 515c or the fourth TRS symbol 515d) were inputted into the Doppler estimation computation, noise would be fed into the model, thereby providing an inaccurate Doppler estimation. Moreover, when there are holes in the received reference signaling at different parts of the spectrum (as is the case for sub-bands three and five in the second TRS slot 510b), there is a phase impact in the TD that may affect the operation of the Doppler estimation (e.g., the holes in the received reference signaling may result in phase distortion with respect to channel impulse responses (CIRs) associated with the reference signaling). Accordingly, in some aspects, an integrity of the Doppler estimation computation is maintained by modifying the Doppler estimation computation based at least in part on detecting the missing reference signaling. Put another way, the UE 120 may modify the Doppler estimation computation to prevent or reduce noise from being inputted into the Doppler estimation computation and thus maintain an accurate Doppler estimation for purposes of channel estimation or the like. Aspects of modifying the Doppler estimation computation based at least in part on detecting the missing reference signaling will be described in more detail in connection with FIG. 7.

As indicated above, FIG. 6 is provided as an example. Other examples may differ from what is described with respect to FIG. 6.

Figure 7:
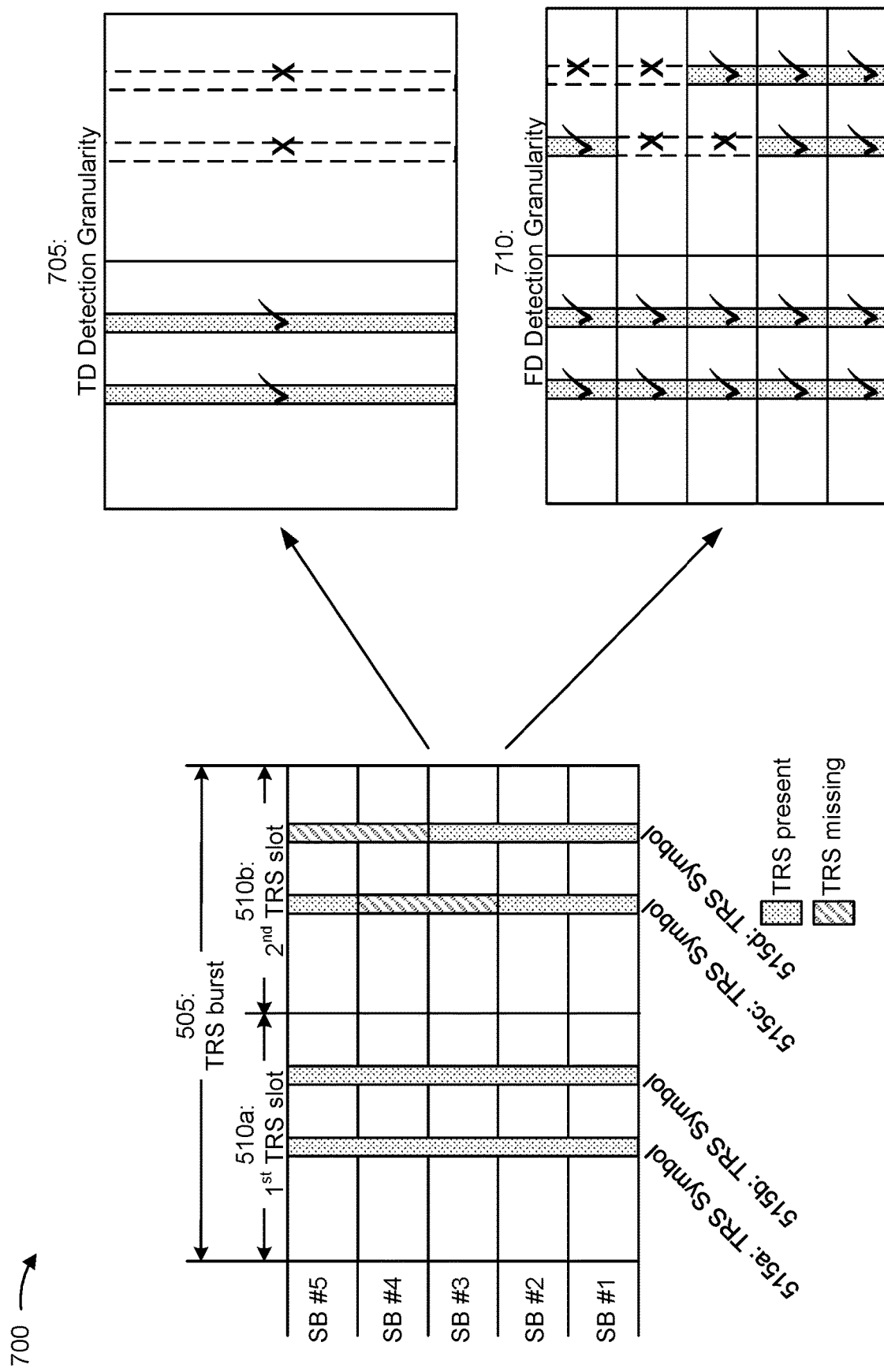
FIG. 7 is a diagram illustrating an example associated with detecting missing reference signaling in a channel, in accordance with the present disclosure.

FIG. 7 is a diagram illustrating an example 700 associated with detecting missing reference signaling in a channel, in accordance with the present disclosure. More particularly, FIG. 7 schematically illustrates detected reference signaling in the TRS burst 505 described in connection with FIG. 5, as detected by a TD detection granularity method (shown by reference number 705), and as detected by an FD detection granularity method (shown by reference number 710).

First, when using the TD detection granularity, the UE 120 may detect whether each reference signal symbol (e.g., each TRS symbol 515), of multiple reference signal symbols associated with a reference signal burst (e.g., the TRS burst 505), includes all expected reference signaling. As shown using a check mark in the TD detection granularity schematic shown at reference number 705, the UE 120 has detected that the first TRS symbol 515a and the second TRS symbol 515b includes all expected reference signaling. In contrast, as shown using an X in the TD detection granularity schematic shown at reference number 705, the UE 120 has detected that the third TRS symbol 515c and the fourth TRS symbol 515d do not include all expected reference signaling.

In some aspects, the TD detection granularity method may be based at least in part on an SNR measurement in the TD. More particularly, the UE 120 may measure the received SNR on the channel in the TD at the time instance at which the reference signaling is expected. For example, the UE 120 may measure the SNR at a reference signal symbol (e.g., a TRS symbol 515) over an entire frequency range of the channel (e.g., over the 100 MHz channel in the example depicted in FIG. 5). The UE 120 may compare the TD SNR measurement with a TD SNR threshold. The UE 120 may detect that the reference signaling is fully present in the channel in the TD based at least in part on a determination that the TD SNR measurement satisfies the TD SNR threshold. The UE 120 may detect that the reference signaling is not fully present in the channel in the TD based on a determination that the TD SNR does not satisfy the TD SNR threshold.

In some aspects, the UE 120, based at least in part on determining that at least a portion of the reference signaling expected in the channel is not present in channel (e.g., based at least in part on determining, using a TD detection granularity, that at least some reference signals are missing expected reference signaling), may modify the Doppler estimation computation by using only reference signal slots of the reference signal burst containing all expected reference signaling, by using only reference signal symbols of the reference signal burst containing all expected reference signaling, or by freezing a Doppler estimation computation if the UE 120 does not detect a threshold level of reference signaling, or otherwise.

For example, the UE 120 may detect, using the TD detection granularity, that each reference signal symbol in at least one slot associated with the reference signal burst includes all expected reference signaling, and thus perform the Doppler estimation computation using the at least one slot. More particularly, in the example shown in FIG. 7, the UE 120 may detect that, even though the second TRS slot 510*b* of the TRS burst 505 includes missing reference signaling, both the first TRS symbol 515*a* and the second TRS symbol 515*b* of the first TRS slot 510*a* includes all expected reference signaling. In such aspects, the UE 120 may modify the Doppler estimation computation by performing the Doppler estimation computation using only reference signaling associated with the slot that includes all expected reference signaling (e.g., the first TRS slot 510*a*). That is, the UE 120 may modify the Doppler estimation computation to include only one-slot processing (e.g., such that the only input is the reference signaling associated with a single slot of the reference signal burst, such as the first TRS slot 510*a* of the TRS burst 505).

In some aspects, the UE 120 may detect, using the TD detection granularity, that there is not at least one slot (e.g., TRS slot 510) associated with the reference signal burst (e.g., TRS burst 505) that includes a threshold value of expected reference signaling. In some aspects, the threshold value of expected reference signaling may be two complete reference signal symbols, while, in some other aspects, the threshold value of expected reference signaling may be less than two complete reference symbol signals. In such aspects, modifying the Doppler estimation computation associated with the channel may include skipping a joint multi-symbol log-likelihood metric for the particular reference signal burst, freezing a filtering state associated with the Doppler estimation computation, and/or relying on a previously computed Doppler estimation for purposes of channel estimation. More particularly, in the example shown in FIG. 7, if at least one of the first TRS symbol 515*a* or the second TRS symbol 515*b* were missing reference signaling (in addition to the third TRS symbol 515*c* and the fourth TRS symbol 515*d*), the UE 120 may determine that there are no TRS slots 510 in the TRS burst 505 including the threshold value of expected reference signaling (e.g., two complete reference signal symbols), and thus may freeze the filter state and rely on a previously computed Doppler estimation for purposes of channel estimation or the like. Although the filter freeze aspects are described above in connection with the threshold value of expected reference signaling, aspects of the disclosure are not so limited. In some other aspects, the UE 120 may freeze the filter state and rely on a previously computed Doppler estimation for purposes of channel estimation or the like even if a threshold value of expected reference signaling, such as when the reference signaling includes certain holes to make it inadequate for Doppler estimation and/or when the reference signaling is otherwise unsuitable or undesirable for Doppler estimation purposes.

In some aspects, the UE 120 may detect, using the TD detection granularity, that at least two reference signal symbols associated with the reference signal burst include all expected reference signaling, and the UE 120 may modify the Doppler estimation computation to use only reference signaling associated with the at least two reference signal symbols. For example, as shown in FIG. 7, the UE 120 may detect that the first TRS symbol 515*a* and the second TRS symbol 515*b* include all expected reference signaling, but that the third TRS symbol 515*c* and the fourth TRS symbol 515*d* do not include all expected reference signaling. Accordingly, the UE 120 may perform the Doppler estimation computation to use only reference signaling associated with the first TRS symbol 515*a* and the second TRS symbol 515*b*. In some other aspects, a different combination of two or more complete TRS symbols 515 may be used (e.g., at least one of the first TRS symbol 515*a* or second TRS symbol 515*b* together with at least one of the third TRS symbol 515*c* or the fourth TRS symbol 515*d*, or at least both the third TRS symbol 515*c* and the fourth TRS symbol 515*d*) without departing from the scope of the disclosure.

When using the FD detection granularity, the UE 120 may detect whether each sub-band, of multiple sub-bands (e.g., SB #1, SB #2, SB #3, SB #4, and SB #5), associated with each reference signal symbol (e.g., each TRS symbol 515), of multiple reference signal symbols associated with a reference signal burst (e.g., the TRS burst 505), includes all expected reference signaling. As shown using a check mark in the FD detection granularity schematic shown at reference number 710, the UE 120 has detected that all expected reference signaling is included in the first sub-band (e.g., SB #1) and the second sub-band (e.g., SB #2). The UE 120 has also detected that, in the third sub-band (e.g., SB #3), all expected reference signaling is included in the first TRS symbol 515*a*, the second TRS symbol 515*b*, and the fourth TRS symbol 515*d*. The UE 120 has also detected that, in the fourth sub-band (e.g., SB #4), all expected reference signaling is included in the first TRS symbol 515*a* and the second TRS symbol 515*b*. And the UE 120 has detected that, in the fifth sub-band (e.g., SB #5), all expected reference signaling is included in the first TRS symbol 515*a*, the second TRS symbol 515*b*, and the third TRS symbol 515*c*. In contrast, as shown using an X in the FD detection granularity schematic shown at reference number 710, the UE 120 has detected that expected reference signaling is not present in the third sub-band (e.g., SB #3) at the third TRS symbol 515*c*, that expected reference signaling is not present in the fourth sub-band (e.g., SB #4) at the third TRS symbol 515*c* and the fourth TRS symbol 515*d*, and that expected reference signaling is not present in fifth sub-band (e.g., SB #5) at the fourth TRS symbol 515*d*.

In some aspects, the UE 120 may detect whether the reference signaling is present using an FD detection granularity based at least in part on measuring a respective SNR in the FD for each sub-band. For example, the SNR measured for a sub-band may be the received SNR on that sub-band. For each sub-band, the UE 120 may compare the respective FD SNR measurement for that sub-band with an FD SNR threshold. The UE 120 may detect that the reference signaling is fully present in the FD for a sub-band based on a determination that the FD SNR measurement for that sub-band satisfies the FD SNR threshold. The UE 120 may detect that the reference signaling is not fully present in the FD for a sub-band based on a determination that the FD SNR measurement for that sub-band does not satisfy the FD SNR threshold.

In some aspects, the UE 120 may detect, using the FD detection granularity, that each reference signal symbol in at least one slot associated with the reference signal burst includes all expected reference signaling, and thus the UE 120 may perform the Doppler estimation computation using the at least one slot. More particularly, in the example shown in FIG. 7, the UE 120 may detect that, even though the second TRS slot 510*b* of the TRS burst 505 includes missing reference signaling, both the first TRS symbol 515*a* and the second TRS symbol 515*b* of the first TRS slot 510*a* includes all expected reference signaling. In such aspects, the UE 120 may modify the Doppler estimation computation by performing the Doppler estimation computation using only reference signaling associated with the slot that includes the complete reference signaling (e.g., the first TRS slot 510*a*). Put another way, the UE 120 may modify the Doppler estimation computation to include only one-slot processing (e.g., such that the only input is the reference signaling associated with a single slot of the reference signal burst, such as the first TRS slot 510*a* of the TRS burst 505).

In some aspects, the UE 120 may detect, using the FD detection granularity, that there is not at least one slot (e.g., a TRS slot 510) associated with the reference signal burst (e.g., the TRS burst 505) that includes a threshold value of expected reference signaling. In some aspects, the threshold value of expected reference signaling may be two complete reference signal symbols, while, in some other aspects, the threshold value of expected reference signaling may be less than two complete reference symbol signals. In such aspects, modifying the Doppler estimation computation associated with the channel may include skipping a joint multi-symbol log-likelihood metric for the particular reference signal burst, freezing a filtering state associated with the Doppler estimation computation, and/or relying on a previously computed Doppler estimation for purposes of channel estimation, as described.

In some aspects, modifying the Doppler estimation computation associated with the channel may include performing the Doppler estimation computation using, for each slot (e.g., each TRS slot 510) of the reference signal burst (e.g., the TRS burst 505), only reference signaling associated with sub-bands that include all expected reference signaling in all reference signal symbols of the corresponding slot. More particularly, in the example shown at reference number 710, for the first TRS slot 510*a*, expected reference signaling is received in each sub-band for both the first TRS symbol 515*a* and the second TRS symbol 515*b*. Thus, with respect to the first TRS slot 510*a* of the TRS burst 505, all reference signaling may be used in the Doppler estimation computation. However, for the second TRS slot 510*b*, only sub-bands 1 and 2 include all expected reference signaling in all TRS symbols 515 (e.g., the third TRS symbol 515*c* and the fourth TRS symbol 515*d*) of the slot. Thus, with respect to the second TRS slot 510*b* of the TRS burst 505, only reference signaling associated with the first and second sub-bands may be used in the Doppler estimation computation.

In some aspects, modifying the Doppler estimation computation associated with the channel includes performing the Doppler estimation computation using only reference signaling associated with sub-bands that include all expected reference signaling in all reference signal symbols (e.g., TRS symbols 515) of the reference signal burst (e.g., TRS burst 505). More particularly, in FIG. 7, only the first sub-band (e.g., SB #1) and the second sub-band (e.g., SB #2) include all expected reference signaling in all TRS symbols 515 of the TRS burst 505. Accordingly, in some aspects, the UE 120 may only use the reference signaling associated with the first and second sub-bands for purposes of the Doppler estimation computation, and, more particularly, for purposes of calculating a joint multi-symbol log-likelihood metric associated with the reference signal burst.

Limiting the use of reference signaling in the Doppler estimation computation to reference signaling that is associated with sub-bands that include all expected reference signaling in all reference signal symbols of a corresponding slot and/or all reference signal symbols across the reference signal burst may be beneficial due to the nature of the Doppler estimation computation. More particularly, the Doppler estimation computation may be based at least in part on computing TD CIRs that are derived from FD TRS symbols 515 using a function such as an FFT, an iFFT, or the like. When there are holes in the received reference signaling at different parts of the spectrum (as is the case for sub-bands three and five in the second TRS slot 510*b*), there is a phase impact in the TD that may affect the operation of the function (e.g., the FFT or iFFT) and thus ultimately the Doppler estimation. Additionally, or alternatively, the holes in the received reference signaling may result in phase distortion with respect to CIRs associated with the reference signaling and/or may lead to an erroneous joint multi-symbol log-likelihood metric calculation associated with the reference signal burst, or the like. Thus, by modifying the Doppler estimation computation to use only reference signaling associated with sub-bands that include all expected reference signaling in all reference signal symbols of the corresponding slot, errors due to the holes in the reference signaling at the various reference signal symbols may be avoided.

In some aspects, modifying the Doppler estimation computation associated with the channel includes performing the Doppler estimation computation using all received reference signaling, but compensating for a phase impact associated with the portion of the reference signaling not being present in the channel. More particularly, in reference to the example shown at reference number 710, the UE 120 may use all reference signaling received in each of the TRS symbols 515, including the reference signaling received in each of the five sub-bands in the first TRS symbol 515*a* and the second TRS symbol 515*b*; the reference signaling received in sub-bands one, two, and five of the third TRS symbol 515*c*; and the reference signaling received in sub-bands one, two, and three of the fourth TRS symbol 515*d*. However, due to the holes in the reference signaling contained in the third TRS symbol 515*c* and the fourth TRS symbol 515*d*, the UE 120 may compensate for the phase impact (e.g., phase distortion) associated with the portion of the reference signaling not being present in the channel at sub-bands three and four in the third TRS symbol 515*c* and at sub-bands four and five in the fourth TRS symbol 515*d*.

As indicated above, FIG. 7 is provided as an example. Other examples may differ from what is described with respect to FIG. 7.

Figure 8:
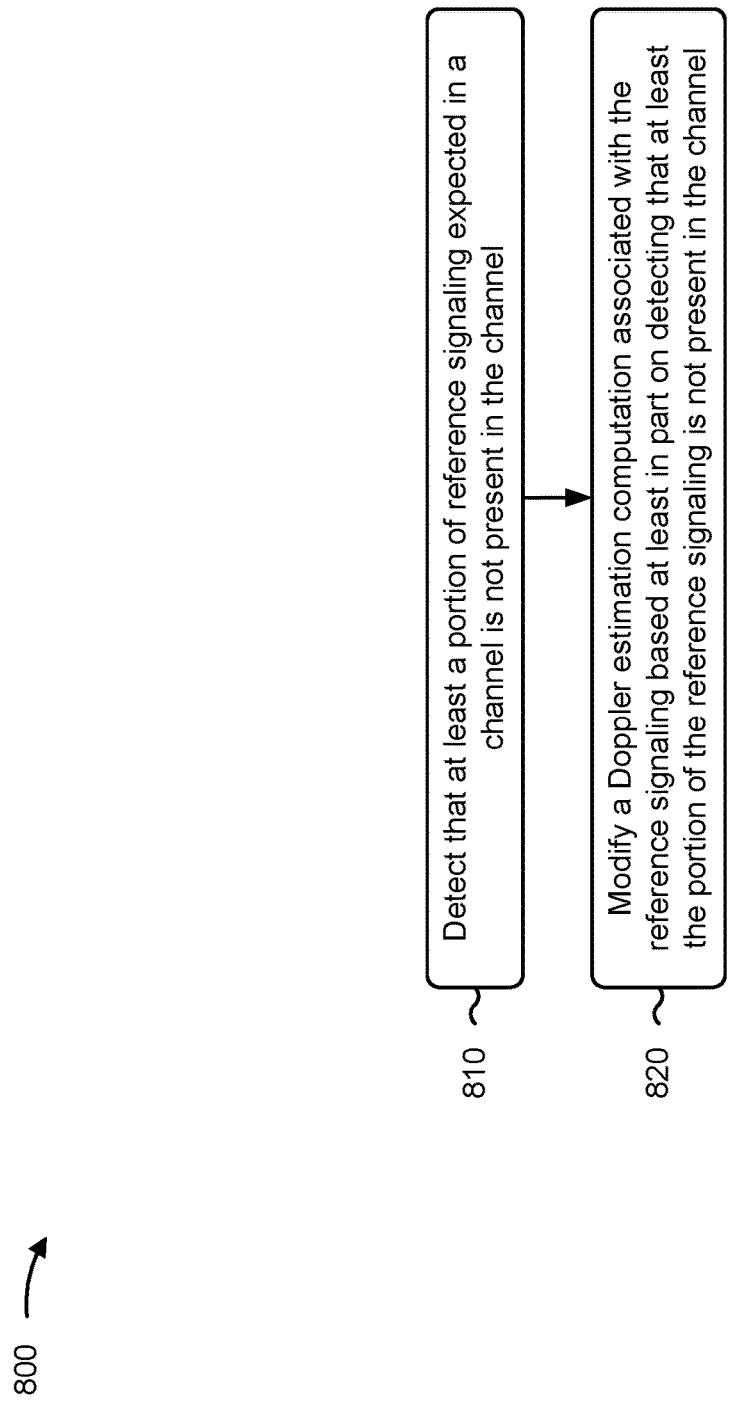
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with modifying a doppler estimation computation for missing reference signaling.

As shown in FIG. 8, in some aspects, process 800 may include detecting that at least a portion of reference signaling expected in a channel is not present in the channel (block 810). For example, the UE (e.g., using communication manager 908 and/or detection component 910, depicted in FIG. 9) may detect that at least a portion of reference signaling expected in a channel is not present in the channel, as described above.

As further shown in FIG. 8, in some aspects, process 800 may include modifying a Doppler estimation computation associated with the reference signaling based at least in part on detecting that at least the portion of the reference signaling is not present in the channel (block 820). For example, the UE (e.g., using communication manager 908 and/or computation component 912, depicted in FIG. 9) may modify a Doppler estimation computation associated with the reference signaling based at least in part on detecting that at least the portion of the reference signaling is not present in the channel, as described above.

Process 800 may include additional aspects, such as any single aspect or any combination of aspects described below and/or in connection with one or more other processes described elsewhere herein.

In a first aspect, the reference signaling is associated with a TRS burst.

In a second aspect, alone or in combination with the first aspect, the channel is associated with an unlicensed spectrum.

In a third aspect, alone or in combination with one or more of the first and second aspects, the Doppler estimation computation includes a joint multi-symbol log-likelihood computation based at least in part on the reference signaling.

In a fourth aspect, alone or in combination with one or more of the first through third aspects, detecting that at least the portion of the reference signaling is not present in the channel is performed using a TD detection granularity by detecting whether each reference signal symbol, of multiple reference signal symbols associated with a reference signal burst, includes all expected reference signaling.

In a fifth aspect, alone or in combination with one or more of the first through fourth aspects, process 800 includes detecting, using the TD detection granularity, that each reference signal symbol in a slot associated with the reference signal burst includes all expected reference signaling, wherein modifying the Doppler estimation computation associated with the channel includes performing the Doppler estimation computation using only reference signaling associated with the slot.

In a sixth aspect, alone or in combination with one or more of the first through fifth aspects, process 800 includes detecting, using the TD detection granularity, that there is not at least one slot associated with the reference signal burst that includes a threshold value of expected reference signaling, wherein modifying the Doppler estimation computation associated with the channel includes freezing a filtering state associated with the Doppler estimation computation.

In a seventh aspect, alone or in combination with one or more of the first through sixth aspects, process 800 includes detecting, using the TD detection granularity, that at least two reference signal symbols associated with the reference signal burst include all expected reference signaling, wherein modifying the Doppler estimation computation associated with the channel includes performing the Doppler estimation computation using only reference signaling associated with the at least two reference signal symbols.

In an eighth aspect, alone or in combination with one or more of the first through seventh aspects, detecting that at least the portion of the reference signaling is not present in the channel is performed using an FD detection granularity by detecting whether each sub-band, of multiple sub-bands, associated with each reference signal symbol, of multiple reference signal symbols associated with a reference signal burst, includes all expected reference signaling.

In a ninth aspect, alone or in combination with one or more of the first through eighth aspects, process 800 includes detecting, using the FD detection granularity, that each reference signal symbol in a slot associated with the reference signal burst includes all expected reference signaling, wherein modifying the Doppler estimation computation associated with the channel includes performing the Doppler estimation computation using only reference signaling associated with the slot.

In a tenth aspect, alone or in combination with one or more of the first through ninth aspects, process 800 includes detecting, using the FD detection granularity, that there is not at least one slot associated with the reference signal burst that includes a threshold value of expected reference signaling, wherein modifying the Doppler estimation computation associated with the channel includes freezing a filtering state associated with the Doppler estimation computation.

In an eleventh aspect, alone or in combination with one or more of the first through tenth aspects, modifying the Doppler estimation computation associated with the channel includes performing the Doppler estimation computation using, for each slot of the reference signal burst, only reference signaling associated with sub-bands that include all expected reference signaling in all reference signal symbols of the corresponding slot.

In a twelfth aspect, alone or in combination with one or more of the first through eleventh aspects, modifying the Doppler estimation computation associated with the channel includes performing the Doppler estimation computation using only reference signaling associated with sub-bands that include all expected reference signaling in all reference signal symbols of the reference signal burst.

In a thirteenth aspect, alone or in combination with one or more of the first through twelfth aspects, modifying the Doppler estimation computation associated with the channel includes performing the Doppler estimation computation using all received reference signaling, and compensating for a phase impact associated with the portion of the reference signaling not being present in the channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
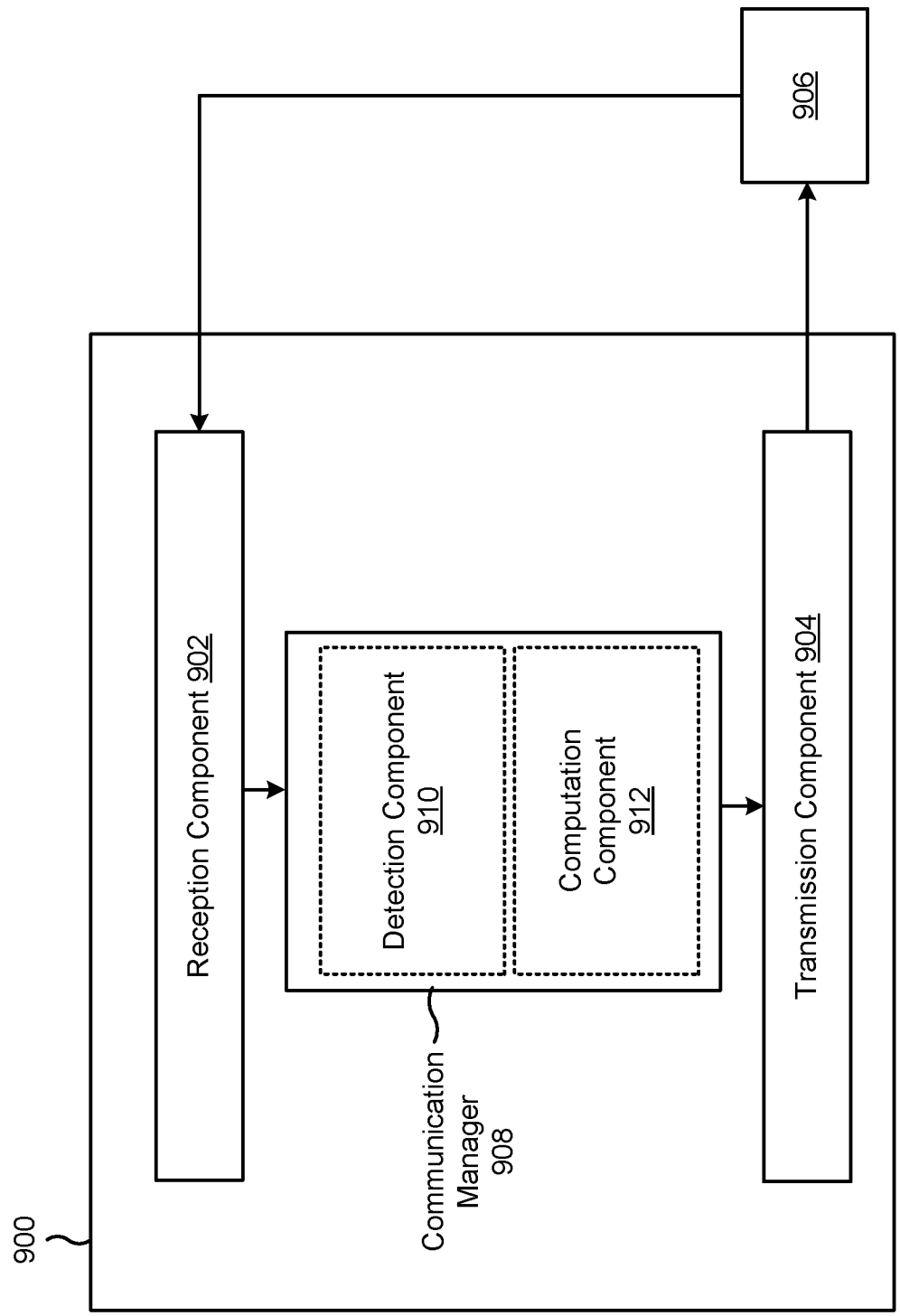
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE (e.g., UE 120), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, a network entity, or another wireless communication device) using the reception component 902 and the transmission component 904. As further shown, the apparatus 900 may include the communication manager 908 (e.g., the communication manager 140). The communication manager 908 may include one or more of a detection component 910 or a computation component 912, among other examples.

In some aspects, the apparatus 900 may be configured to perform one or more operations described herein in connection with FIGS. 6-7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The detection component 910 may detect that at least a portion of reference signaling expected in a channel is not present in the channel. The computation component 912 may modify a Doppler estimation computation associated with the reference signaling based at least in part on detecting that at least the portion of the reference signaling is not present in the channel.

The detection component 910 may detect, using the TD detection granularity, that each reference signal symbol in a slot associated with the reference signal burst includes all expected reference signaling, wherein modifying the Doppler estimation computation associated with the channel includes performing the Doppler estimation computation using only reference signaling associated with the slot.

The detection component 910 may detect, using the TD detection granularity, that there is not at least one slot associated with the reference signal burst that includes a threshold value of expected reference signaling, wherein modifying the Doppler estimation computation associated with the channel includes freezing a filtering state associated with the Doppler estimation computation.

The detection component 910 may detect, using the TD detection granularity, that at least two reference signal symbols associated with the reference signal burst include all expected reference signaling, wherein modifying the Doppler estimation computation associated with the channel includes performing the Doppler estimation computation using only reference signaling associated with the at least two reference signal symbols.

The detection component 910 may detect, using the FD detection granularity, that each reference signal symbol in a slot associated with the reference signal burst includes all expected reference signaling, wherein modifying the Doppler estimation computation associated with the channel includes performing the Doppler estimation computation using only reference signaling associated with the slot.

The detection component 910 may detect, using the FD detection granularity, that there is not at least one slot associated with the reference signal burst that includes a threshold value of expected reference signaling, wherein modifying the Doppler estimation computation associated with the channel includes freezing a filtering state associated with the Doppler estimation computation.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: detecting that at least a portion of reference signaling expected in a channel is not present in the channel; and modifying a Doppler estimation computation associated with the reference signaling based at least in part on detecting that at least the portion of the reference signaling is not present in the channel.

Aspect 2: The method of Aspect 1, wherein the reference signaling is associated with a TRS burst.

Aspect 3: The method of any of Aspects 1-2, wherein the channel is associated with an unlicensed spectrum.

Aspect 4: The method of any of Aspects 1-3, wherein the Doppler estimation computation includes a joint multi-symbol log-likelihood computation based at least in part on the reference signaling.

Aspect 5: The method of any of Aspects 1-4, wherein detecting that at least the portion of the reference signaling is not present in the channel is performed using a TD detection granularity by detecting whether each reference signal symbol, of multiple reference signal symbols associated with a reference signal burst, includes all expected reference signaling.

Aspect 6: The method of Aspect 5, further comprising detecting, using the TD detection granularity, that each reference signal symbol in a slot associated with the reference signal burst includes all expected reference signaling, wherein modifying the Doppler estimation computation associated with the channel includes performing the Doppler estimation computation using only reference signaling associated with the slot.

Aspect 7: The method of Aspect 5, further comprising detecting, using the TD detection granularity, that there is not at least one slot associated with the reference signal burst that includes a threshold value of expected reference signaling, wherein modifying the Doppler estimation computation associated with the channel includes freezing a filtering state associated with the Doppler estimation computation.

Aspect 8: The method of Aspect 5, further comprising detecting, using the TD detection granularity, that at least two reference signal symbols associated with the reference signal burst include all expected reference signaling, wherein modifying the Doppler estimation computation associated with the channel includes performing the Doppler estimation computation using only reference signaling associated with the at least two reference signal symbols.

Aspect 9: The method of any of Aspects 1-4, wherein detecting that at least the portion of the reference signaling is not present in the channel is performed using a FD detection granularity by detecting whether each sub-band, of multiple sub-bands, associated with each reference signal symbol, of multiple reference signal symbols associated with a reference signal burst, includes all expected reference signaling.

Aspect 10: The method of Aspect 9, further comprising detecting, using the FD detection granularity, that each reference signal symbol in a slot associated with the reference signal burst includes all expected reference signaling, wherein modifying the Doppler estimation computation associated with the channel includes performing the Doppler estimation computation using only reference signaling associated with the slot.

Aspect 11: The method of Aspect 9, further comprising detecting, using the FD detection granularity, that there is not at least one slot associated with the reference signal burst that includes a threshold value of expected reference signaling, wherein modifying the Doppler estimation computation associated with the channel includes freezing a filtering state associated with the Doppler estimation computation.

Aspect 12: The method of Aspect 9, wherein modifying the Doppler estimation computation associated with the channel includes performing the Doppler estimation computation using, for each slot of the reference signal burst, only reference signaling associated with sub-bands that include all expected reference signaling in all reference signal symbols of the corresponding slot.

Aspect 13: The method of Aspect 9, wherein modifying the Doppler estimation computation associated with the channel includes performing the Doppler estimation computation using only reference signaling associated with sub-bands that include all expected reference signaling in all reference signal symbols of the reference signal burst.

Aspect 14: The method of Aspect 9, wherein modifying the Doppler estimation computation associated with the channel includes: performing the Doppler estimation computation using all received reference signaling; and compensating for a phase impact associated with the portion of the reference signaling not being present in the channel.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at user equipment (UE), comprising:
   one or more memories; and
   one or more processors, coupled to the one or more memories, configured to:
   detect that at least a portion of reference signaling expected in a channel is not present in the channel; and
   modify a Doppler estimation computation associated with the reference signaling based at least in part on detecting that at least the portion of the reference signaling is not present in the channel, wherein the Doppler estimation computation includes a joint multi-symbol log-likelihood computation based at least in part on the reference signaling.

2. The apparatus of claim 1, wherein the reference signaling is associated with a tracking reference signal burst.

3. The apparatus of claim 1, wherein the channel is associated with an unlicensed spectrum.

4. The apparatus of claim 1, wherein detecting that at least the portion of the reference signaling is not present in the channel is performed using a time domain detection granularity by detecting whether each reference signal symbol, of multiple reference signal symbols associated with a reference signal burst, includes all expected reference signaling.

5. The apparatus of claim 4, wherein the one or more processors are further configured to detect, using the time domain detection granularity, that each reference signal symbol in a slot associated with the reference signal burst includes all expected reference signaling, wherein modifying the Doppler estimation computation associated with the channel includes performing the Doppler estimation computation using only reference signaling associated with the slot.

6. The apparatus of claim 4, wherein the one or more processors are further configured to detect, using the time domain detection granularity, that there is not at least one slot associated with the reference signal burst that includes a threshold value of expected reference signaling, wherein modifying the Doppler estimation computation associated with the channel includes freezing a filtering state associated with the Doppler estimation computation.

7. The apparatus of claim 6, wherein the threshold value of expected reference signaling comprises two reference signal symbols.

8. The apparatus of claim 4, wherein the one or more processors are further configured to detect, using the time domain detection granularity, that at least two reference signal symbols associated with the reference signal burst include all expected reference signaling, wherein modifying the Doppler estimation computation associated with the channel includes performing the Doppler estimation computation using only reference signaling associated with the at least two reference signal symbols.

9. The apparatus of claim 1, wherein detecting that at least the portion of the reference signaling is not present in the channel is performed using a frequency domain detection granularity by detecting whether each sub-band, of multiple sub-bands, associated with each reference signal symbol, of multiple reference signal symbols associated with a reference signal burst, includes all expected reference signaling.

10. The apparatus of claim 9, wherein the one or more processors are further configured to detect, using the frequency domain detection granularity, that each reference signal symbol in a slot associated with the reference signal burst includes all expected reference signaling, wherein modifying the Doppler estimation computation associated with the channel includes performing the Doppler estimation computation using only reference signaling associated with the slot.

11. The apparatus of claim 9, wherein the one or more processors are further configured to detect, using the frequency domain detection granularity, that there is not at least one slot associated with the reference signal burst that includes a threshold value of expected reference signaling, wherein modifying the Doppler estimation computation associated with the channel includes freezing a filtering state associated with the Doppler estimation computation.

12. The apparatus of claim 9, wherein the one or more processors, to modify the Doppler estimation computation associated with the channel, are configured to perform the Doppler estimation computation using, for each slot of the reference signal burst, only reference signaling associated with sub-bands that include all expected reference signaling in all reference signal symbols of the slot.

13. The apparatus of claim 9, wherein the one or more processors, to modify the Doppler estimation computation associated with the channel, are configured to perform the Doppler estimation computation using only reference signaling associated with sub-bands that include all expected reference signaling in all reference signal symbols of the reference signal burst.

14. The apparatus of claim 9, wherein the one or more processors, to modify the Doppler estimation computation associated with the channel, are configured to:
   perform the Doppler estimation computation using all received reference signaling; and
   compensate for a phase impact associated with the portion of the reference signaling not being present in the channel.

15. A method of wireless communication performed by a user equipment (UE), comprising:

detecting that at least a portion of reference signaling expected in a channel is not present in the channel; and modifying a Doppler estimation computation associated with the reference signaling based at least in part on detecting that at least the portion of the reference signaling is not present in the channel, wherein the Doppler estimation computation includes a joint multi-symbol log-likelihood computation based at least in part on the reference signaling.

16. The method of claim 15, wherein the reference signaling is associated with a tracking reference signal burst.

17. The method of claim 15, wherein the channel is associated with an unlicensed spectrum.

18. The method of claim 15, wherein detecting that at least the portion of the reference signaling is not present in the channel is performed using a time domain detection granularity by detecting whether each reference signal symbol, of multiple reference signal symbols associated with a reference signal burst, includes all expected reference signaling.

19. The method of claim 18, further comprising detecting, using the time domain detection granularity, that each reference signal symbol in a slot associated with the reference signal burst includes all expected reference signaling, wherein modifying the Doppler estimation computation associated with the channel includes performing the Doppler estimation computation using only reference signaling associated with the slot.

20. The method of claim 18, further comprising detecting, using the time domain detection granularity, that there is not at least one slot associated with the reference signal burst that includes a threshold value of expected reference signaling, wherein modifying the Doppler estimation computation associated with the channel includes freezing a filtering state associated with the Doppler estimation computation.

21. The method of claim 18, further comprising detecting, using the time domain detection granularity, that at least two reference signal symbols associated with the reference signal burst include all expected reference signaling, wherein modifying the Doppler estimation computation associated with the channel includes performing the Doppler estimation computation using only reference signaling associated with the at least two reference signal symbols.

22. The method of claim 15, wherein detecting that at least the portion of the reference signaling is not present in the channel is performed using a frequency domain detection granularity by detecting whether each sub-band, of multiple sub-bands, associated with each reference signal symbol, of multiple reference signal symbols associated with a reference signal burst, includes all expected reference signaling.

23. The method of claim 22, further comprising detecting, using the frequency domain detection granularity, that each reference signal symbol in a slot associated with the reference signal burst includes all expected reference signaling, wherein modifying the Doppler estimation computation associated with the channel includes performing the Doppler estimation computation using only reference signaling associated with the slot.

24. The method of claim 22, wherein modifying the Doppler estimation computation associated with the channel includes performing the Doppler estimation computation using, for each slot of the reference signal burst, only reference signaling associated with sub-bands that include all expected reference signaling in all reference signal symbols of the slot.

25. The method of claim 22, wherein modifying the Doppler estimation computation associated with the channel includes performing the Doppler estimation computation using only reference signaling associated with sub-bands that include all expected reference signaling in all reference signal symbols of the reference signal burst.

26. The method of claim 22, wherein modifying the Doppler estimation computation associated with the channel includes:

performing the Doppler estimation computation using all received reference signaling; and compensating for a phase impact associated with the portion of the reference signaling not being present in the channel.

27. A non-transitory computer-readable medium storing a set of instructions for wireless communication, the set of instructions comprising:

one or more instructions that, when executed by one or more processors of a user equipment (UE), cause the UE to:

detect that at least a portion of reference signaling expected in a channel is not present in the channel; and modify a Doppler estimation computation associated with the reference signaling based at least in part on detecting that at least the portion of the reference signaling is not present in the channel, wherein the Doppler estimation computation includes a joint multi-symbol log-likelihood computation based at least in part on the reference signaling.

28. The non-transitory computer-readable medium of claim 27, wherein the reference signaling is associated with a tracking reference signal burst.

29. An apparatus for wireless communication, comprising:

means for detecting that at least a portion of reference signaling expected in a channel is not present in the channel; and means for modifying a Doppler estimation computation associated with the reference signaling based at least in part on detecting that at least the portion of the reference signaling is not present in the channel, wherein the Doppler estimation computation includes a joint multi-symbol log-likelihood computation based at least in part on the reference signaling.

30. The apparatus of claim 29, wherein the channel is associated with an unlicensed spectrum.

* * * * *